US012761151B2

(12) United States Patent
Zhang et al.

(10) Patent No.: US 12,761,151 B2
(45) Date of Patent: Oct. 13, 2026

(54) INTEGRATING SPHERE-BASED FLUORESCENCE DETECTION SYSTEM FOR REAL-TIME QUANTITATIVE PCR DEVICE

(71) Applicant: Aumintec Inc., Richmond Hill (CA)

(72) Inventors: Kai Zhang, Toronto (CA); Kaidi Wang, Toronto (CA); Zonghua Liu, Newmarket (CA); Zhengqi Wang, Markham (CA)

( * ) Notice: Subject to any disclaimer, the term of this patent is extended or adjusted under 35 U.S.C. 154(b) by 515 days.

(21) Appl. No.: 18/375,479

(22) Filed: Sep. 30, 2023

(65) Prior Publication Data

US 2025/0110052 A1 Apr. 3, 2025

(51) Int. Cl.

*G01N 21/64* (2006.01)
*B01L 3/00* (2006.01)
*B01L 7/00* (2006.01)

(52) U.S. Cl.

CPC ...... *G01N 21/6428* (2013.01); *B01L 3/50851* (2013.01); *B01L 7/52* (2013.01); *G01N 21/6456* (2013.01); *B01L 2300/0654* (2013.01); *B01L 2300/18* (2013.01); *G01N 2201/062* (2013.01); *G01N 2201/0636* (2013.01); *G01N 2201/065* (2013.01)

(58) Field of Classification Search

None

See application file for complete search history.

(56) References Cited

U.S. PATENT DOCUMENTS

| | | | | |
|---|---|---|---|---|
| 2008/0277606 | A1* | 11/2008 | Wang | B01L 3/5027 264/21 |
| 2014/0107942 | A1* | 4/2014 | Dasgupta | G01N 21/6402 250/200 |
| 2014/0185042 | A1* | 7/2014 | Baets | G01N 21/658 356/301 |
| 2017/0290943 | A1* | 10/2017 | Stokes | G01N 21/33 |
| 2023/0296526 | A1* | 9/2023 | Ng | G01J 3/44 356/301 |

FOREIGN PATENT DOCUMENTS

| | | |
|---|---|---|
| GB | 2554483 | * 4/2018 |

* cited by examiner

*Primary Examiner* — Rebecca M Giere

(74) *Attorney, Agent, or Firm* — Nasser Ashgriz; UIPatent Inc.

(57) ABSTRACT

The present invention is an integrating sphere-based fluorescence detection system for real-time quantitative PCR device comprising various components, including PCR sample reaction plate, illumination sources configured to produce excitation light, detection source configured to detect fluorescence emission light produced, in response to the excitation light from the sample reaction plate, an integrating sphere configured to direct the excitation light to the sample plate uniformly and to direct the fluorescence emission light from the sample holder along a response path to the imaging module. The system may enhance the quality of excitation light hitting samples in the sample holder.

20 Claims, 5 Drawing Sheets

INTEGRATING SPHERE-BASED FLUORESCENCE DETECTION SYSTEM FOR REAL-TIME QUANTITATIVE PCR DEVICE

FIELD OF THE INVENTION

The present invention relates generally to medical devices, and especially to polymerase chain reaction (PCR) devices.

BACKGROUND OF THE INVENTION

The detection of nucleic acids is central to medicine, forensic science, industrial processing, and many other fields. The ability to detect disease conditions (e.g., cancer), infectious organisms (e.g., HIV), genetic lineage, genetic markers and many other techniques. Determination of the integrity of a nucleic acid of interest can be relevant to the pathology of an infection or cancer. One of the most powerful and basic technologies to detect small quantities of nucleic acids is to replicate some or all of a nucleic acid sequence many times, and then analyze the amplification products. PCR is perhaps the most well-known of a number of different amplification techniques. PCR is a powerful technique for amplifying short sections of DNA. With PCR, one can quickly produce millions of copies of DNA starting from a single template DNA molecule.

Real-time PCR refers to a growing set of techniques in which one measures the buildup of amplified DNA products as the reaction progresses, typically once per PCR cycle. Monitoring the accumulation of products over time allows one to determine the efficiency of the reaction, as well as to estimate the initial concentration of DNA template molecules. Currently a number of commercial machines exist that perform real-time PCR.

More recently, a number of high throughput approaches to performing PCR and other amplification reactions have been developed, e.g., involving amplification reactions in microfluidic devices, as well as methods for detecting and analyzing amplified nucleic acids in or on the devices.

In real-time quantitative PCR devices, fluorescence is used as an indicator of how many copies of DNA that have been amplified. To achieve this, one needs to excite the PCR samples which are normally placed in a multiple well plate. Most common PCR sample plate has 96 wells. All of these samples should be illuminated with particular light in a uniform manner so that the fluorescence signals from each well can be compared.

In real-time quantitative polymerase chain reaction (PCR) device, fluorescence emission light is measured as indication of detected DNA quantity. To do this, excitation light of different wavelengths is projected onto the PCR sample plate, which contains multiple liquid samples. The corresponding fluorescence emission light is detected by a CMOS camera.

Fluorescence has become the basis of many analytical and diagnostic techniques in biology and medicine due to its sensitivity, selectivity, and versatility. These techniques include polymerase chain reaction (PCR), including real-time or quantitative PCR (qPCR), among others. The PCR reaction, in turn, may be used to determine gene expression and the presence or absence of a pathogen or pathogenic state, among many other uses. PCR is used to amplify nucleic acids. Fluorescence is used in PCR to detect the amplified nucleic acids, typically by nonspecific binding to any amplified product or specific binding to a particular amplified product. The binding, which is indicative of the reaction, is associated with a measurable change in fluorescence. Fluorescence-based PCR assays may be conducted on a single sample or many samples by shining "excitation" light on those samples and observing the resulting fluorescence "emission" light. It is important in these fluorescence-based analyses to have quality illumination, free from spatial inhomogeneities and shadows. Otherwise, variations in fluorescence may reflect variations in illumination rather than variations in the samples.

Currently available PCR devices use different technologies, such as Multiple-mirror reflection (Roche Life Science), Distributed optical fibers (Roche Life Sciences) and Optical lens and beam-splitter combination, to illuminate one sample well at a time and then move the entire optical system to scan 96 wells (Bio-Rad). The major shortcomings associated with these methods are that "Multiple mirror" method is bulky, expensive, difficult to manufacture. "Distributed optical fibers" method is difficult to manufacture, since each of the hundreds of fibers needs to be polished, assembled and aligned precisely, in addition, it makes the system quite fragile. "Optical lens-beam-splitter-scanning" method measures the fluorescence signal from each well of the 96-well plate one by one, which causes the entire fluorescence signal acquisition process very slow.

The present invention achieved the uniform illumination through the use of integrating sphere-based design, which is effective, low-cost and easy to manufacture. Integrating spheres, also known as photometric spheres are cavity spheres coated with diffuse reflective material on their inner walls. In general, the wall of a single sphere has a light inlet and a light outlet. The light inlet allows light to enter the integrating sphere and the light outlet is for positioning a light receiving device.

The basic working principle of existing integrating spheres for measuring light intensity is in general as follows. After the light enters the integrating sphere through the light inlet, the light is uniformly reflected and diffused by the inner wall coating of the integrating sphere. A homogeneous light intensity distribution is then formed on the sphere inner surface, and an extremely uniform diffusive beam is ultimately emitted through the light outlet.

Generally, in precision measurements, an integrating sphere can be used as an optical diffuser to minimize the light nonuniformity. When measuring luminous flux using an integrating sphere, the obtained results are more reliable. It is because the integrating sphere can reduce and eliminate the measurement errors caused by different shapes of light beams, different divergence angles, and differences in response degrees at different positions of a detector.

Integrating spheres are used for a variety of optical measurements. They are used to measure the total light radiated in all directions from a lamp. An integrating sphere can be used to create a light source with apparent intensity uniform over all positions within its circular aperture. An integrating sphere can be used to measure the diffuse reflectance of surfaces, providing an average over all angles of illumination and observation. Light scattered by the interior of the integrating sphere is evenly distributed over all angles. The total power of a light source can be measured without inaccuracy caused by the directional characteristics of the source, or the measurement device. Reflection and absorption of samples can be studied.

Integrating sphere has never been applied in the PCR applications. The present invention achieved the uniform illumination for PCR application through the use of integrating sphere-based design, which is effective, low-cost and easy to manufacture

SUMMARY OF THE INVENTION

The present invention is directed to a biologic sample preparation system that prepares samples for analytic processing. The samples may be prepared for detecting or quantifying biological molecules, such as DNA or RNA, in biological samples, for example by PCR processes for amplifying nucleic acids. The method further comprises detecting or quantifying a nucleic acid (such as chromosomal DNA, plasmid DNA, viral DNA, mRNA, microRNA, a nucleic acid biomarker, etc.)

In real-time quantitative polymerase chain reaction (PCR) device, fluorescence emission light is measured as indication of detected DNA quantity. To do this, excitation light of different wavelengths is projected onto the PCR sample plate, which contains multiple liquid samples. The corresponding fluorescence emission light is detected by a CMOS camera. The present invention achieved the uniform illumination through the use of integrating sphere-based design. Other devices used traditional optical lens, mirrors, beam splitter and optical fibers to achieve uniform illumination of multiple PCR samples.

In classic optical engineering practice, integrating sphere is usually used to measure the total optical power out of a large light source such as a fluorescence tube lamp or an incandescent lamp bulb by putting the light source inside the integrating sphere.

An important feature of the invention resides in the shape of the sphere having a white-color, low light-absorption, highly scattering surface on the inside. The metallic integrating sphere is used as the central structure. The inside of the integrating sphere is coated with white-color light-diffusing material to scatter photons into all directions. Uniform illumination of the PCR sample plate by the excitation light is achieved. The light beam entering the sphere will be eventually uniformly distributed on the inner surface of the sphere after multiple scatterings.

The present invention achieves uniform illumination of 96-well PCR plate with different wavelengths of light, and takes photographs of the same PCR plate with selected wavelength of fluorescence light passing through. The multi-sample PCR plate are illuminated with light. The integrating sphere has two LED light sources mounted on the right side and the left side of the sphere. The LED is a 6-color-in-one chip. Different color of LED light can be switched on selectively. Each color of LED light needs an optical filter to block the unwanted light output. A step motor driven filter wheel is used for each LED chip to switch different filters. The LED generated light is homogenized within the sphere and uniformly distributed on the PCR sample plate.

On the top of the sphere, there is an opening which allows the CMOS camera above the sphere to detect the fluorescent light outputs from all the samples simultaneously by taking a photograph. The switching of different wavelengths of excitation light is achieved with a filter wheel which contain multiple number of optical filters. The switching of different wavelengths of fluorescence emission light from PCR sample is also achieved with a filter wheel which contains multiple number of optical filters.

The PCR sample plate is made of white-color polymer material with top open, which allows for more excitation light to come into sample well, and more fluorescent light to exit from the top of the plate and to be detected by the camera.

Two excitation light sources are used in order to achieve the required uniformly distributed optical power on the PCR samples, which are mounted symmetrically on the integrating sphere. A plurality of reflectors are used to gather more output photons and redirect them towards the integrating sphere. The filter wheels are driven by step motors which are controlled by computer.

The switching of different wavelengths of excitation light is achieved with filter wheel which contains multiple number of optical filters. The switching of different wavelengths of fluorescence emission light from PCR sample is also achieved with a filter wheel which contains multiple number of optical filters.

Therefore, it is an object of the present invention to use integrating sphere technology in PCR process to illuminate all samples in the sample plate at a time and simultaneously and in a uniform manner.

It is another object of the present invention to provide a more compact, much lower cost, and easy to manufacture method.

It is another object of the present invention that can be used by all Real-time quantitative PCR device manufacturers for their PCR devices.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

DETAILED DESCRIPTION OF PREFERRED EMBODIMENTS

Figure 1:
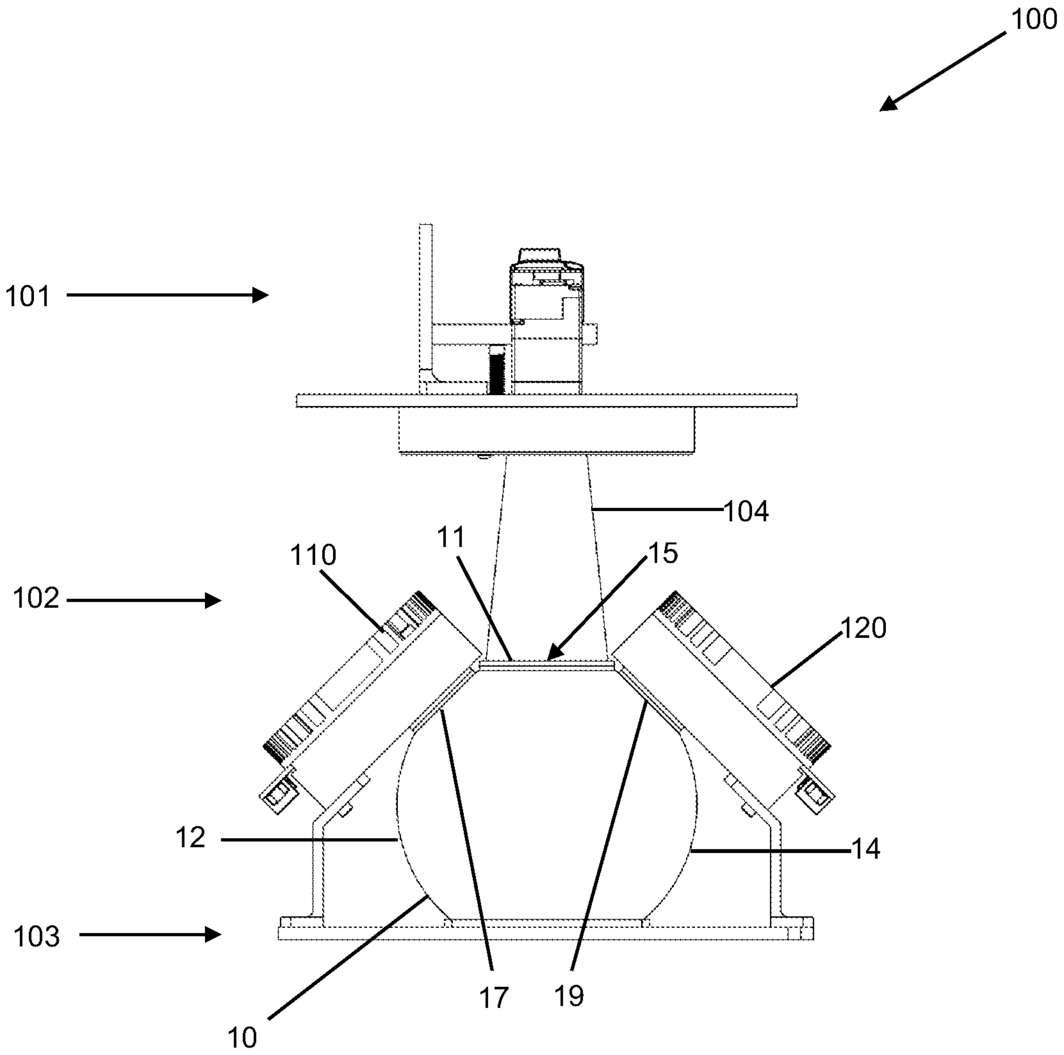
FIG. 1 is a front view of the integrating sphere-based fluorescence detection system for real-time PCR machine, according to the present invention.
Figure 2:
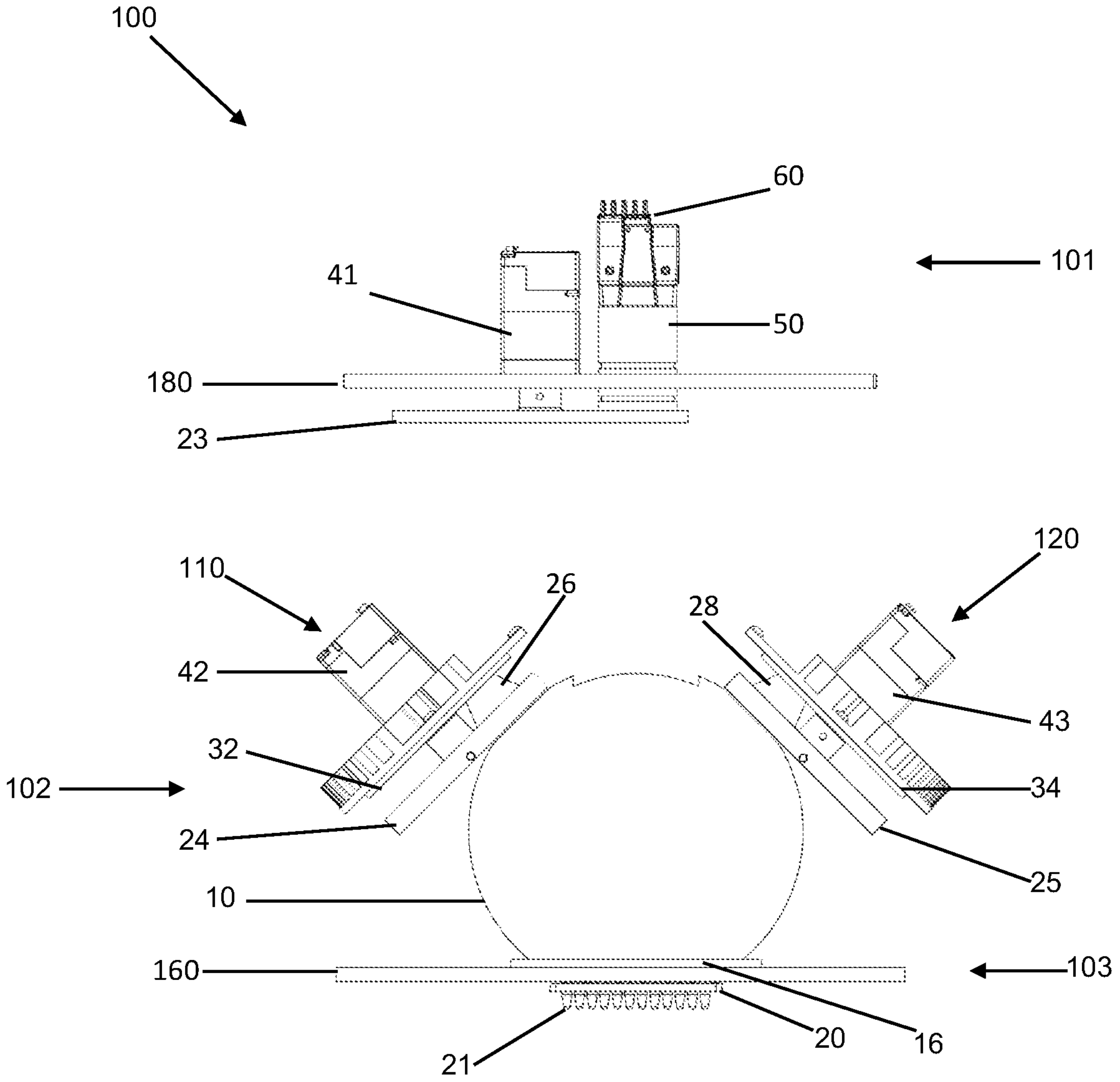
FIG. 2 is a front elevation view of integrating sphere-based fluorescence detection system for real-time PCR machine, according to the present invention.
Figure 3:
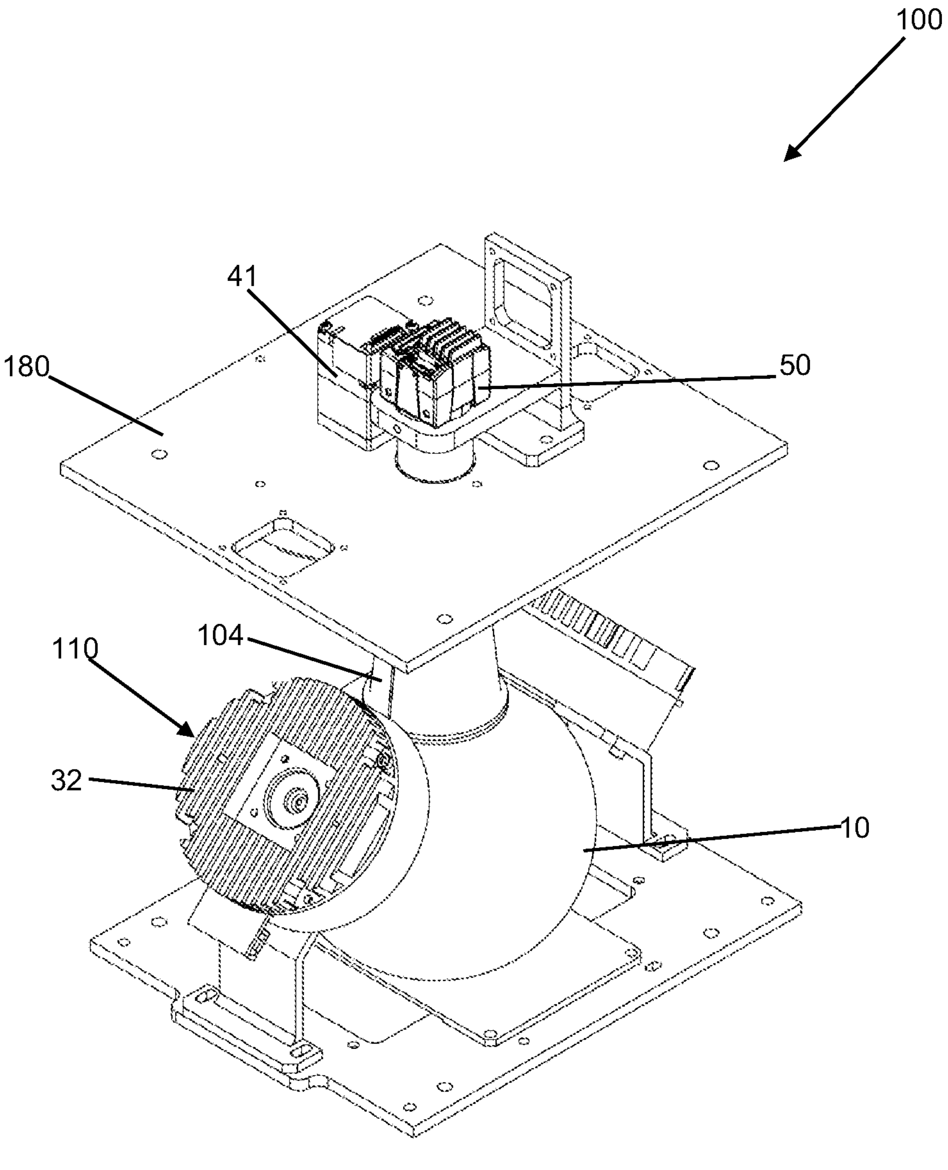
FIG. 3 is a perspective view of the left side of the integrating sphere-based fluorescence detection system for real-time PCR machine, according to the present invention.
Figure 4:
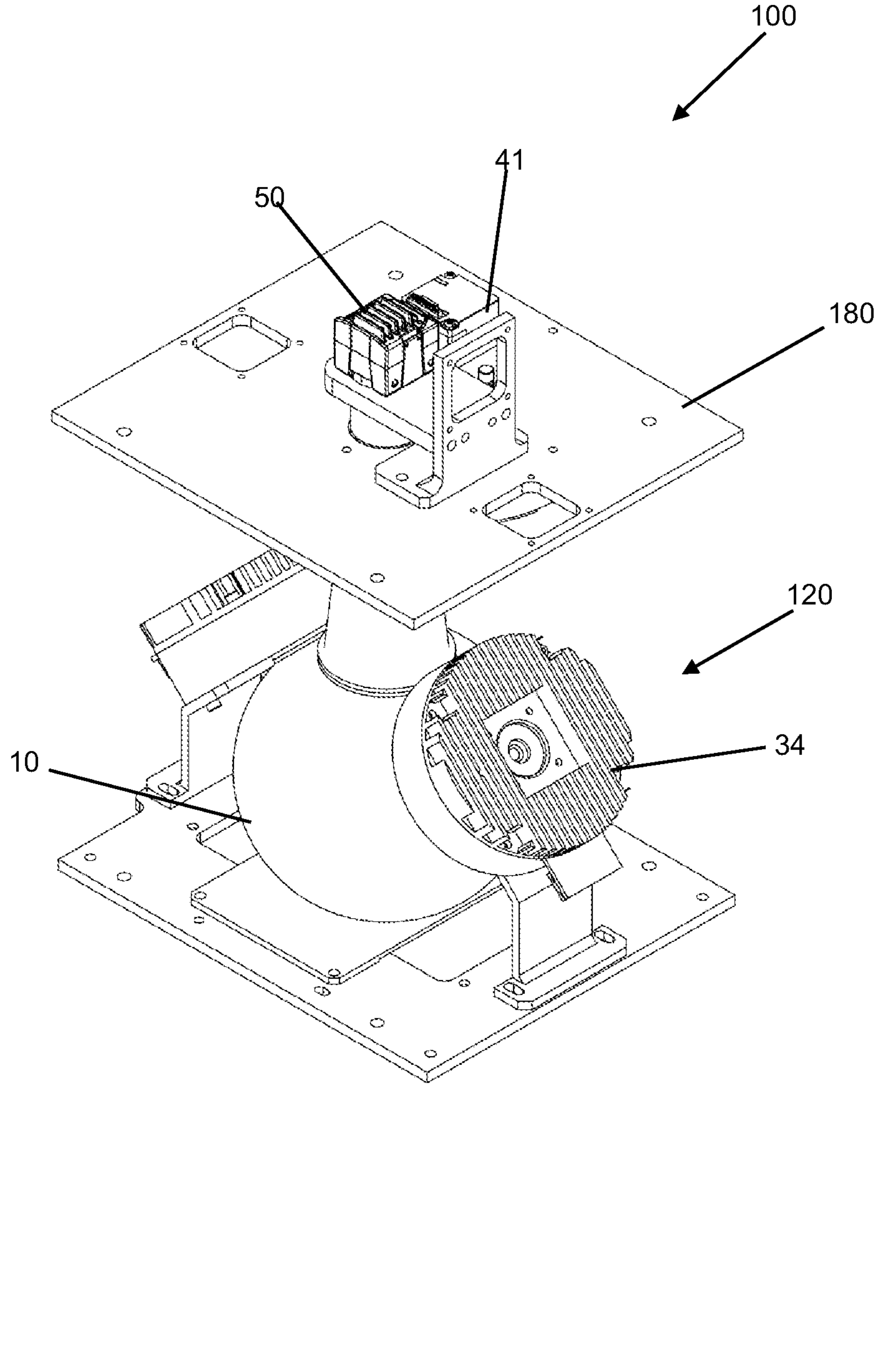
FIG. 4 is a perspective view of the right side of the integrating sphere-based fluorescence detection system for real-time PCR machine, according to the present invention.

In real-time quantitative polymerase chain reaction (PCR) device, fluorescence emission light is measured as indication of detected DNA quantity. To do this, excitation light of different wavelengths is uniformly projected onto the PCR sample plate which contains multiple liquid samples. The corresponding fluorescence emission light is detected by a CMOS camera.

The present disclosure provides a fluorescence detection system suitable for qPCR and other fluorescence-based analyses. In the present disclosure two excitation light sources are used in order to achieve the required uniformly distributed optical power on the PCR samples, which are mounted symmetrically on the integrating sphere.

FIGS. 1 to 4 show the integrating sphere-based fluorescence detection system for real-time PCR machine. The device 100 is an upright frame having a top portion 101, a central portion 102 and a bottom portion 103. A multi-sample PCR reaction plate 20 is placed on the bottom portion 103 of the device to be illuminated with light.

The device 100 comprises a metallic integrating sphere 10 in the central portion 102 of the device. The sphere 10 is mounted on the lower support plate 160 installed on the bottom portion 103 of the device. The inside of the integrating sphere 10 is coated with white-color light-diffusing material to scatter photons into all directions to achieve a uniform illumination of the PCR sample plate 20 by the excitation light. Two excitation light sources 110 and 120 are used in order to achieve the required uniformly distributed optical power on the PCR sample plate 20, which are mounted symmetrically on the integrating sphere 10. Light sources 110 and 120 are LED light sources configured to produce excitation light capable of exciting fluorescence emission light from the samples in the sample holder 20. In a preferred embodiment the sphere has a diameter of 150 mm which works best with respect to the sample plate-filter-camera combination.

The first LED light source 110 is mounted on the left side 12 of the sphere and the second LED light source 120 is mounted symmetrically on the right side 14 of the sphere. The two light sources 110 and 120 are set with an angle in the range of 0 to 90 degrees with respect to the vertical to illuminate the 96-well sample plate 20. More than 90 degrees will cause illumination optical power on the 96-well sample plate to reduce significantly.

The LED light sources 110 and 120 have each a LED board 32 and 34. The LED board is a 6-color-in-one chip. Different color of LED light can be switched on selectively. Each color of LED light needs an optical filter to block the unwanted light output.

The first light source 110 has a first step motor driven filter wheel 24 for LED chip 32 to switch different filters. The LED generated light is homogenized within the sphere 10 and uniformly distributed on the PCR sample plate 20. Symmetrically, the second light source 120 has a second step motor driven filter wheel 25 for LED chip 34 to switch different filters. The LED generated light is homogenized within the sphere 10 and uniformly distributed on the PCR sample plate 20. The switching of different wavelengths of excitation light is achieved with the first filter wheel 24 and second filter wheel 25 which contains multiple number of optical filters.

There are two openings on the left side 12 and right side 14 of the sphere to let the fluorescence excitation light from two LEDs entering into sphere 10. The opening 17 on the left side 14 is to allow the light from the LED board 32 to enter the sphere 10. The opening 19 on the right side 14 is to allow the light from LED board 34 to enter the sphere 10. The openings 17 and 19 are about 30 mm in diameter and through the light directly into the sphere 10 and prevent it from scattering around.

The top portion 101 of the device comprises of components configured to detect fluorescence emission light emitted in response to excitation light and produce a corresponding signal or other representation for further analysis such that fluorescence emitted from different samples at different positions on the sample can be observed simultaneously. The device 100 comprises a complementary metal-oxide semiconductor (CMOS) camera 50 on the top portion 101 installed on the upper support plate 180.

The camera 50 is positioned above the integrating sphere 10 to detect the fluorescent light outputs from all the samples 21 on the sample plate 20 simultaneously by taking a photograph. The fluorescence emission light produced by the samples in response to the excitation light are detected and form an image which typically will be represented electronically. The integrating sphere 10 has an opening 15 on the top portion 11 which allows the CMOS camera 50 above the sphere 10 to detect the fluorescent light outputs from all the samples simultaneously by taking a photograph. The switching of different wavelengths of fluorescence emission light from PCR samples 21 on the sample plate 20 is achieved with a third filter wheel 23 which contains multiple number of optical filters. The filter wheel 23 is driven by step motor 41.

According to FIG. 1 again the integrating sphere 10 has a circular opening 15 on the top portion 11 which allows the CMOS camera 50 to take pictures of the PCR sample plate 20. The light is guided through a conical light guide 104 mounted between the top portion 101 and the top opening 15 above the sphere to guide the fluorescent light outputs from all the samples simultaneously. The light guide 104 configured to direct the excitation light from the camera 50 along an illumination path to the sample plate 20 and to direct the fluorescence emission light from the sample plate 20 along the path. The switching of different wavelengths of excitation light is achieved with filter wheels 24 and 25 which contains multiple number of optical filters. The opening on the top 15 for the camera is about 50 mm in diameter.

The PCR sample plate 20 is made of white-color polymer material. Each PCR sample plate 20 contains of multiple liquid sample wells 21. Most common PCR sample plates 20 has 96 wells 21. All of these samples should be illuminated with particular light in a uniform manner so that the fluorescence signals from each well 21 can be compared. Fluorescence emission light is measured as indication of detected DNA quantity. To do this, excitation light of different wavelengths is projected onto the PCR sample plate 20 which contains multiple liquid samples. The corresponding fluorescence emission light is detected by the CMOS camera 50. Uniform illumination of the PCR sample plate 20 by the excitation light is achieved. The light beam entering the sphere 10 will be eventually uniformly distributed on the inner surface of the sphere after multiple scatterings.

The PCR sample plate 20 has a top opening (not shown) which allows for more excitation light to enter the sample wells 21 and more fluorescent light to exit from the top opening of the sample plate 20 and to be detected by the camera 50. The PCR sample plate 20 is made of white-color non-fluorescence material to let sample generated fluorescence light reflected to the inside of the sphere 10 and more excitation light to enter into the sample wells 21. Each well 21 of the PCR sample plate 20 is further made of white-color non-fluorescence material to let sample generated fluorescence light reflected to the inside of the sphere 10. In manufacturing process a rectangular opening 16 is opened on the bottom 13 of the integrating sphere 10 to fit the PCR sample plate 20. The bottom opening 16 of the sphere has a dimension of about 61 mm length and 44 mm width to fit 96-well sample plate 20.

According to FIG. 2 again light source 110 has a metal reflector mounted in front of the LED chip to gather more output photons and redirect towards the integrating sphere 10. A first cone-shape reflector 26 is mounted in front of the LED board 32 to gather more output photons and redirect them towards the integrating sphere 10. Symmetrically, light source 120 has further a second reflector 28 mounted in front of the LED board 34 to gather more output photons and redirect towards the integrating sphere 10. The light that comes out of the LED boards is in about 100 degrees of diverging angle. Therefore, to make the lights more efficient the reflectors are used. The reflectors further prevent of the light to be scattered around.

The LED board used in the light sources 110 and 120 have a copper board with 6-chips with 6 different colors. The sample wells 21 are illuminated with various colors. The LED boards 32 and 34 are selectively powered-on one by one to respond to different colors. Excitation light produced by a given light source in the array is first incident upon a corresponding excitation filter. Here, the excitation filters are organized in a planar array such that light from a given light source passes through a corresponding filter (e.g., a green-pass filter for a light source being used to produce green excitation light, a red-pass filter for a light source being used to produce red excitation light, etc.). Light sources and corresponding filters may be arranged in any suitable manner.

The wavelengths of LED's which illuminate the samples have to be pure with specific wavelengths. Optical filters are used to create particular wavelengths to go through. Since the LED board has 6 different colors, then 6 filters are used. To switch the filters, in this case step motors are used to rotate the filter wheels. All the filter wheels have 6 filters mounted on the wheels for 6 color selection.

The switching of different wavelengths of fluorescence emission light from PCR sample plate 20 is also achieved with a third filter wheel 23. The third filter wheel 23 is installed in front of the CMOS camera 50 on the top portion 101 of the device which contains multiple number of optical filters. The filter wheel 23 allows for only interested fluorescence light to pass through and is further driven by step motor 41. All the step motors are controlled by the computer 60 of the system. The pictures taken by the CMOS camera 50 will then be analyzed by a software application. Therefore, 96 pictures taken from 96 samples will be compared for PCR process.

In the present invention the two light sources are used to ensure that the optical power illuminating the 96-well sample plate is enough to generate fluorescence signals to be detected. This was determined experimentally. However, If the future LED technology improves so that more powerful LED chip is utilized here, 1 light source will be enough. It will then reduce the system component cost. This is the reason that Embodiment 2 was included in the patent description.

Figure 5:
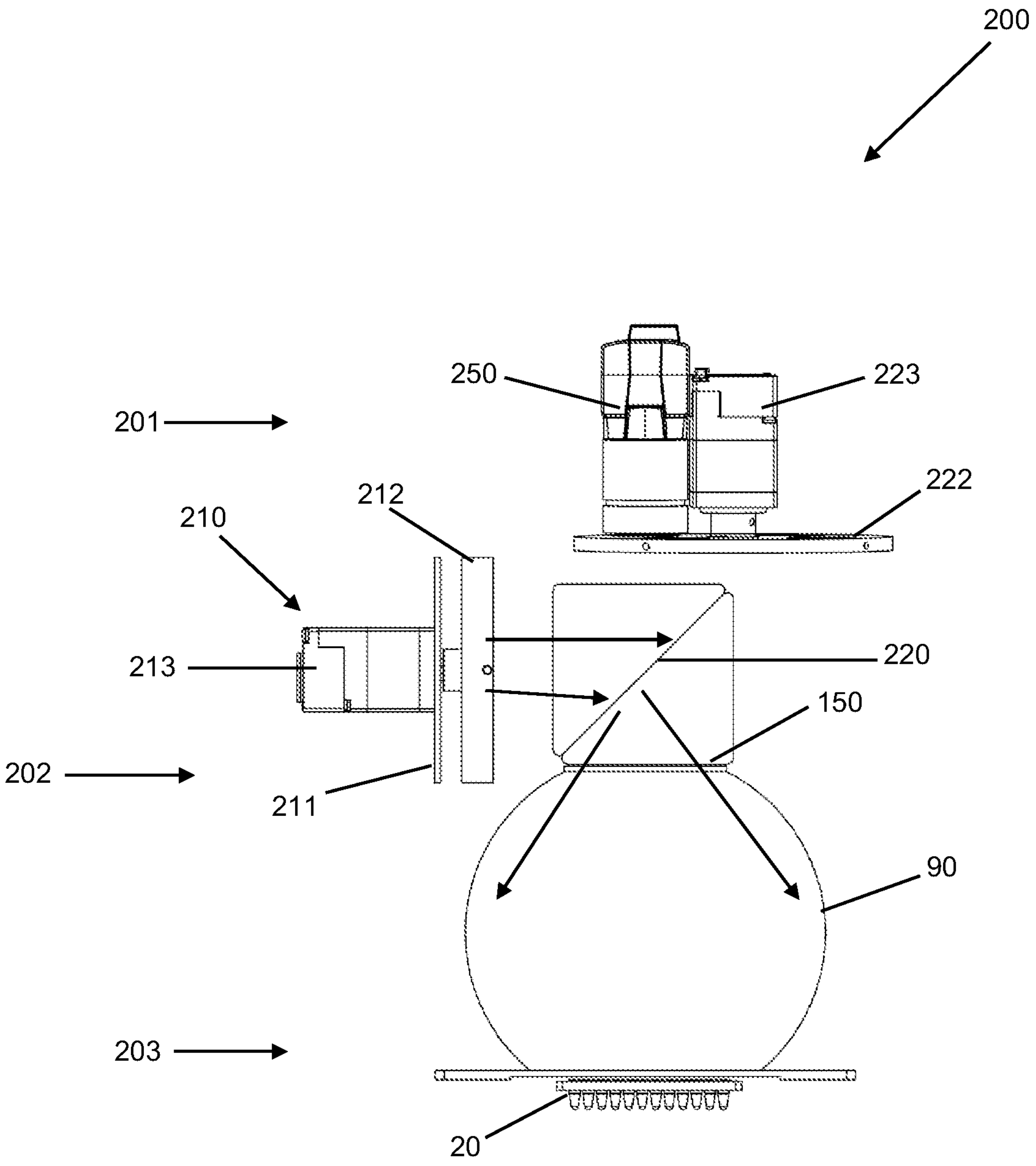
FIG. 5 is another embodiment of the integrating sphere-based fluorescence detection system for real-time PCR machine, according to the present invention.

FIG. 5 shows another embodiment of the integrating sphere-based fluorescence detection system for real-time PCR machine 200. The device 200 is an upright frame having a top portion 201, a central portion 202 and a bottom portion 203. A multi-sample PCR reaction plate 20 is placed on the bottom portion 203 of the device to be illuminated with light.

The device 200 comprises a metallic integrating sphere 90 mounted on the bottom portion 203 of the device. The inside of the integrating sphere 10 is coated with white-color light-diffusing material to scatter photons into all directions to achieve a uniform illumination of the PCR sample plate 20 by the excitation light.

In this embodiment only one light source 210 is used for excitation light. The light source 210 is mechanically mounted on one side of the device 204 on the support frame in the central portion of the device and comprises a multi-color LED 211. The individual LEDs are electronically controlled on or off. Each color of LED has a corresponding optical filter to remove the unwanted wavelength. These excitation light filters are installed on the rotating filter Wheel 212 controlled by a Motor 213 to move to the location aligned with the optical filter.

The device 200 has a dichroic mirror 220 mounted on the top opening 150 of the integrating sphere in front of the light source 210 to allow the lights of a certain wavelength emitted from the light source 210 to pass through. The dichroic mirror 220 is aligned at 45 degrees to the vertical axis and reflects the excitation light from the Multicolor LED 211 into the integrating sphere 90 and allows the fluorescence emission light generated to travel through upwards to reach the optical detector CMOS camera 250.

A second filter Wheel 222 is mounted in front of the CMOS camera 250 which is controlled by a second Motor 223. The filters installed on this wheel are such that they match the fluorescence emission signal wavelength range. For example, when 420 nm-480 nm passband excitation filter is in front of the LED array chip, the 507 nm-519 nm passband emission filter is in front of the camera. Likewise, 537 nm-553 nm band excitation filter corresponds to 575 nm-585 nm passband emission filter; 567 nm-583 nm band excitation filter corresponds to 615 nm-625 nm passband emission filter; 628 nm-638 nm band excitation filter corresponds to 670 nm-680 nm passband emission filter.

The fluorescence emission signals from all samples in the 96 wells sample plate 20 are detected simultaneously by the monochromatic CMOS camera 250 with lens as black-and-white image. The arrows shown in FIG. 5 show light beam directions.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. An integrating sphere-based fluorescence detection system for real-time quantitative PCR device, comprising:

a. an upright structure having a top portion, a central portion and a bottom portion;

b. a PCR sample plate placed on the bottom portion and configured to hold a plurality of sample wells;

c. an integrating sphere disposed in the central portion configured to receive an excitation light and diffusely distribute the excitation light within the integrating sphere, the integrating sphere has a top side, a bottom side, a right side, a left side, a right opening, a left opening and a top opening;

d. a right light source and a left light source symmetrically mounted on the integrating sphere and configured to generate the excitation light and introduce the excitation light into the integrating sphere through the right opening and the left opening, and e. a camera disposed on the top portion configured to capture fluorescence emission light emitted from the plurality of sample wells through the top opening of the integrating sphere in response to the excitation light generated by the right light source and the left light source;

wherein the excitation light generated by the right light source and the left light source is projected onto the PCR sample plate and the excitation light entering the integrating sphere is uniformly distributed on an inner surface of the integrating sphere after multiple scatterings and the corresponding fluorescence emission light is detected by the camera, thereby, enabling uniform illumination of the PCR sample plate and measurement of detected DNA quantity.

2. The system of claim 1, wherein the integrating sphere is a metallic sphere and wherein the inside of the integrating sphere is coated with white-color light-diffusing material to scatter photons into all directions to achieve a uniform illumination of the PCR samples by the excitation light.

3. The system of claim 1, wherein the first light source and the second light source are multi-LED chip array each having a 6-color LED board to produce 6 different color of LED light, wherein fluorescence excitation light source of different wavelengths is generated by the multi-LED chip array.

4. The system of claim 3, wherein the multi-LED chips are mounted on a first and second filter wheels to selectively switch different colors, and wherein the LED generated light is homogenized within the integrating sphere and uniformly distributed on the PCR sample plate.

5. The system of claim 1, wherein a vertical axis of the upright structure is defined, and the right light source and the left light source are oriented at an angle in the range of 0 to 90 degrees relative to the vertical axis.

6. The system of claim 1, wherein switching of different wavelengths of the excitation light is achieved with a first filter wheel and a second filter wheel which contain a multiple number of optical filters, and wherein the first filter wheel and the second filter wheel are driven by a first step motor and a second step motor.

7. The system of claim 6, wherein the first filter wheel and the second filter wheel have a plurality of optical filters corresponding to respective wavelengths of the excitation light, configured for each color to be rotated to achieve a selected wavelength.

8. The system of claim 1, wherein the right opening of the integrating sphere and the left opening of the integrating sphere are about 30 mm in diameter.

9. The system of claim 1, wherein each of the right light source and the left light source comprises a multi-LED chip and a reflector mounted in front of the multi-LED chip configured to gather and redirect photons toward the integrating sphere, thereby, making the lights more efficient and reducing light scattering.

10. The system of claim 1, wherein the camera comprises a CMOS camera.

11. The system of claim 1, wherein switching of different wavelengths of fluorescence emission light from the plurality of sample wells is achieved with a third filter wheel which contains multiple number of optical filters and is driven by a third step motor.

12. The system of claim 11, wherein the third filter wheel is mounted in front of the camera on the top portion and configured to allow selected fluorescence emission wavelengths to pass therethrough.

13. The system of claim 1, wherein a conical light guide is positioned between the top portion of the device and the top opening of the integrating sphere, and configured to direct fluorescence emission light from the sample plate toward the camera.

14. The system of claim 1, wherein the PCR sample plate is made of white-color non-fluorescence material to let sample generated fluorescence light reflected to the inside of the sphere and more excitation light to enter into the sample wells.

15. The system of claim 1, wherein the diameter of the sphere is 120 mm.

16. An integrating sphere-based fluorescence detection system for real-time quantitative PCR device, comprising:

a. an upright structure having a top portion, a central portion and a bottom portion;

b. a PCR sample plate placed on the bottom portion and configured to hold a plurality of sample wells;

c. an integrating sphere disposed in the central portion and configured to receive an excitation light and diffusely distribute the excitation light within the integrating sphere, the integrating sphere has a top side, a bottom side, and an opening;

d. a light source mounted on one side of the upright structure and configured to generate the excitation light and introduce the excitation light into the integrating sphere through the opening;

e. a dichroic mirror mounted on the top side of the integrating sphere and positioned in front of the light source, wherein the dichroic mirror is configured to reflect the excitation light from the light source into the integrating sphere;

f. a camera positioned on the top portion and configured to capture fluorescence emission light emitted from the plurality of sample wells in response to the excitation light generated by the light source;

wherein, the excitation light generated by the light source is projected onto the PCR sample plate which contains multiple liquid samples and the excitation light entering the integrating sphere is uniformly distributed on an inner surface of the integrating sphere after multiple scatterings and the corresponding fluorescence emission light travels upward through the dichroic mirror and is comparison of fluorescence signals from the plurality of sample wells, wherein the fluorescence emission light is measured as an indication of detected DNA quantity.

17. The system of claim 16, wherein the light source is a multi-LED chip array each having a 6-color LED board to produce 6 different color of LED light, wherein fluorescence excitation light source of different wavelengths is generated by the multi-LED chip array and are electronically controlled on or off.

18. The system of claim 17, wherein the multi-LED chip is mounted on a filter wheel to selectively switch different colors, and wherein the LED generated light is homogenized within the integrating sphere and uniformly distributed on the PCR sample plate.

19. The system of claim 16, wherein a vertical axis of the upright structure is defined, and the dichroic mirror is aligned at an angle of about 45 degrees relative to the vertical axis.

20. The system of claim 16, wherein the light source is parallel to the dichroic mirror.

* * * * *